Feb. 6, 1968  G. MEINECKE ETAL  3,367,231
CONTROLLING MECHANISM FOR A SPECTROMETER
Filed Jan. 14, 1964
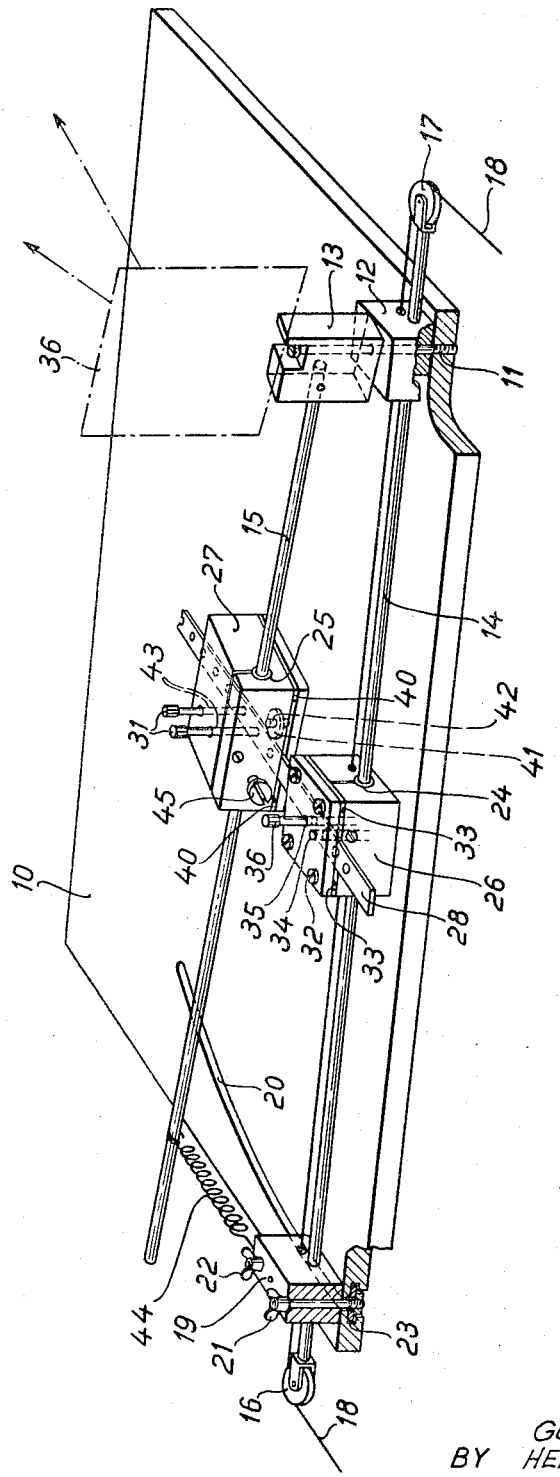
INVENTORS
GUNTHER MEINECKE
BY HERIBERT LÜSSEM
Toulmin & Toulmin
Attorneys United States Patent Office 3,367,231
Patented Feb. 6, 1968

3,367,231
CONTROLLING MECHANISM FOR A
SPECTROMETER
Günther Meinecke and Heribert Lüssem, Wetzlar, Germany, assignors to Ernst Leitz G.m.b.H., Wetzlar, Germany
Filed Jan. 14, 1964, Ser. No. 337,610
Claims priority, application Germany, Jan. 17, 1963,
L 43,908
8 Claims. (Cl. 88—14)

ABSTRACT OF THE DISCLOSURE

A mechanism for rotating the grating of a spectrometer in response to the translational movement of a control member. A first rod rotates the grating about a vertical axis and a second rod is a track for the control member. A third rod connects the control member with a carriage which rides on the first rod, the three rods together defining a right-angled triangle. When the hypotenuse of the triangle lies along the first rod, the wave number of the light diverted along a particular line by the grating is linearly related to the displacement of the control member. When the hypotenuse of the triangle lies along the second rod, the wavelength of the light diverted in a particular direction by the grating is linearly related to the displacement of the control member. Means are provided for causing the hypotenuse to lie along the one of said rods selected by the operator.

*Background of the invention*

This invention relates to spectrometers and the like and is particularly concerned with a controlling or adjusting mechanism for effecting adjustment under controlled conditions of a grating forming a part of a spectrometer.

In connection with the spectrometers, particularly infrared spectrometers, there is increasing use of flat reflection or diffraction gratings which have the advantage of a much greater resolving power in certain spectral regions than can be obtained from prisms.

In connection with the use of such gratings it is of particular advantage for the spectrum being examined to be plotted in a graph wherein the abscissa is subdivided linearly either into wave lengths or into wave numbers which are represented by $1/\lambda$.

It is well known that a curved plate can be constructed, the rotation of which can follow the linear subdivisions of the abscissa by use of a suitable mechanism. An arrangement of this type, however, is quite expensive and the fitting of the device to an existing spectrometer is quite difficult.

The difficulty of using curved plates has led to efforts to substitute other simpler, more inexpensive devices for the curved plates. For example, an apparatus has been made for rotating a flat diffraction grating of a spectrometer about an axis parallel to the lines of the grating, said rotation being accomplished by means of a lever arm connected to the grating and engaged by an actuating mechanism.

That portion of the lever arm engaged by the actuating mechanism is circular in cross section and the arrangement is such that in a plane perpendicular to the axis of rotation of the grating, a straight line through the middle of the circular cross section of the lever arm and the axis of rotation of the grating will form with another straight line an angle line in a predetermined plane. Said predetermined plane contains the axis of the grating and is perpendicular to the direction of movement of the actuating mechanism for the particular angle formed is the arithmetical mean of the angle of incidence and the diffraction angle of the rays impinging on the grating.

This arrangement provides that a shifting of the center of the circular cross section along a straight line parallel to the projection in the diffraction plane of the line of motion of the portion of the actuating mechanism will be proportional to the change in length of the actuating member.

This relationship will result in a uniform gradation based on wave lengths.

There is also known a spectrometer with a plane grating which is rotatable about an axis parallel to the lines of the grating.

In this case the grating is rotated by means of a lever rigid with the grating and having a straight edge which is engaged by an actuating member of circular form.

The actuating member referred to is operated by a screw or any other rectilinearly movable member so that the center of curvature of the circular portion will move in a straight line which intersects the axis of rotation of the grating. This arrangement will also result in uniform gradations except that it is based on wave numbers.

Still further, it has been proposed to provide a diffraction spectrometer with a lever of variable length connected with the grating to control the angular position thereof, said lever being rotatably mounted and having a spherically formed end which is kept in sliding contact with a rectilinear guiding surface by a suitable spring. This arrangement also results in uniform gradations also based on wave numbers.

*Summary of the invention*

A primary object of the present invention is to provide a control or adjusting arrangement for the grating of the spectrometer which is capable of producing uniform gradations based on either wave lengths or wave numbers.

Another particular object of this invention is the provision of a mechanism of the nature referred to which is easily convertible from calibration according to wave lengths to calibration according to wave numbers with a minimum of change.

A still further object of the present invention is the provision of a mechanism of the nature referred to which is relatively simple to construct and operate and which is accurate in all adjusted positions.

The mechanism of the present invention consists, generally, of three preferably rectilinear parts with junction points so that a triangle is formed thereby and, in particular, a right triangle.

Two of the three parts have their adjacent ends pivotally connected and one of the parts at the said pivotal connection carries the grating which is angularly adjustable in accordance with movement angularly of the part to which it is connected.

The other of the two interconnected parts is normally fixedly positioned but is adjustable with respect to the said position.

The third part of the three part mechanism is arranged so that it can be adjusted into right angle relationship with either of the aforementioned parts, depending on whether the mechanism is to respond linearly to wave lengths or to wave numbers.

The distance between the means connecting the third part with the first two mentioned parts is variable, while the said third part and said means connecting it with the first two mentioned parts are jointly adjustable relative to the pivotal interconnection of the first two mentioned parts.

*Brief description of the drawing*

The drawing shows a preferred, but not necessarily the only, embodiment of the present invention.

Description of the preferred embodiment

Referring now to the drawing it will be seen that there is a base plate 10 of rigid construction to which is connected, by a bolt 11, the two mounting blocks 12 and 13, both pivotable on bolt 11 and also pivotable with respect to each other.

On a base plate 10 two guide bars 14, 15 are pivotally mounted on a bolt 11 by means of the two supporting pieces or mounting blocks 12, 13. Bar 14 carries guide rollers 16, 17 in its slotted ends for a cable 18 while at its end opposite bolt 11 it is held in position by a member 19. The latter is guided and positioned in a slot 20 in the plate 10 by means of bolts 21, 22 anchored to a counter pressure plate 23 which can be held in any position in the slot 20.

Two bearing bodies 26, 27 are slidably mounted on the guide bars 14, 15 by means of cylindrical bushings 24, 25, which may, for instance, be ball bushings; the bodies 26, 27 being connected by a flat bar 28 with a plurality of holes spaced uniformly therealong. The bearing body 27 is formed of two pieces separated from each other by spacers 40 to provide a clear space for receiving the flat bar 28. In this space 40 there is also a roller 41 on a bolt 42 whose central axis intersects the axis of the guide bar 15. The body 27 can be fastened to the bar 15 by means of a screw 45 and is also provided with two holes 43 that are spaced from each other by a distance equal to the distance between successive holes in the flat bar 28 so that after insertion of the pins 31 into the holes of the flat bar, the latter and the guide bar 15 will be at right angles to each other as shown in the drawing. A spring 44 exerts tension between the bar 15 and the holding member 19.

The bearing body 26 consists of a plurality of parts, the upper and the lower part being connected by screws 32 but kept apart by spacers 33 in such a manner that a clear space 33 will be kept between them for receiving the flat bar 28. The body 26 is provided with holes 34, 35 spaced apart by the same distance as the holes in the flat bar 28. Into the hole 35 a pin 36 is inserted to serve as a pivot pin between the parts 28 and 26. When the pin 36 is withdrawn, the distance between the parts 26 and 27 can be changed with simultaneous adjustment of the guide bars 14 and 15. If the right angular relationship that has heretofore been maintained between the parts 15 and 28 is to be transferred to the parts 14 and 28, the screw 45 is tightened and the pins 31 removed from the holes 43 and one of them is inserted into the hole 34 and into the corresponding hole in the flat bar 28 which is now guided by the roller 41, in bearing member 27. The block 13 has mounted thereon in the usual manner a grating 36. The cable 18 is secured to the member 26 and passes through holes in the block 12 and member 19. Upon actuation of the cable the member 26 will be moved along the bar 14, which will at the same time swing the bar 15 about the pivot bolt 11 and impart angular movement to the grating 36.

With the apparatus shown in the drawing there will be a linear relationship between the movement of the cable and the wave length of the light that is diverted by the grating. When the pins 31 are removed from the holes 43; after tightening of the screw 45; and insertion of one of the pins in the hole 34, there will be a linear relationship between the movement of the cable and the wave numbers of the light. If a different unit of measurement is to be used, the pin 36 is also withdrawn and the flat bar 28 is shifted the required distance, after which it is again held in place by replacing the pin in part 26 or pins in part 27. By loosening the screws 21, 22 and shifting the member 19 in the slot 20, different portions of the spectrum can be brought into position.

It will be understood that the particular mechanism shown in the drawings is merely exemplary of many different ways of practicing the present invention. For example, instead of employing a cable 18, guide bar 14 can take the form of a threaded spindle rotatably mounted in blocks 12 and 19 and screw threaded to body 26 so that rotation of the spindle would accomplish the movement of the body longitudinally thereof. Similarly rack and pinion means could be employed for actuating body 26 if so desired.

Still further, while there has been shown a simple mechanical manually operable arrangement for control of the pin 31, mechanical or electrical coupling means could be utilized and thereby control pins in the holes 30 and 34 between effective and ineffective positions so that shifting from wavelength gradations to wave number gradations could easily be accomplished by operating a switch.

Also, the flat bar 28 could be latchingly engaged with the sliding bodies 26 and 27 by levers, ratchets, and the like, which could be operated from a remote station if so desired.

Still other modifications and adaptations of the present invention will occur to those styled in the art.

We claim:

1. An apparatus for adjustably controlling the position of the grating of a spectrometer, comprising: a base member; means carried by the base member forming a pivot axis; first and second elongated members intersecting said pivot axis and pivoted thereto, one of said elongated members forming the hypotenuse of a right triangular structure when the other one of said elongated members forms one of the legs of said structure; said first elongated member being immovably connected to said base member and said second elongated member supporting said grating in a plane including said pivot axis; a third elongated member extending between said first and second elongated members and serving as the other end one of the legs of said structure; the wavelength of the light diverted in a particular direction by said grating being linearly related to the length of said hypotenuse when said first elongated member forms the hypotenuse, and the wave number of the light diverted in a particular direction by said grating being linearly related to the length of said one of the legs of said structure when said first member forms said one of the legs of said structure; means for translating the point of intersection of said third elongated member along said first elongated member; and means for selectively causing said hypotenuse and said one of the legs of said structure to lie along said first elongated member, when the wavelength and the wave number of the light are respectively desired as a readout.

2. An apparatus for adjustably controlling the position of the grating of a spectrometer, comprising: a base member; means on the base member forming a pivot axis; first and second rod members pivoted on said pivot axis and having their axes intersecting said pivot axis, one of said rod members being immovably connected to said base member; means on the other rod member for supporting said grating in a plane including said pivot axis; first and second block members slidable on said first and second rod members respectively; a bar extending between said block members; and means for selectively fixing the bar member to the block member slidable on said one of said rod members and to the other of said block members at right angles to the rod member on which the selected block slides for spectrometer readout in wave numbers and wavelength respectively.

3. An apparatus according to claim 2 in which said block members include ball bushings through which said rod members extend.

4. An apparatus according to claim 2 in which the movement of said block members longitudinally of said rod members is accomplished by actuating means which moves parallel to said one of said rod members and is coupled to the block member which slides therealong.

5. An apparatus according to claim 2 in which the said one of said rod members which is immovably connected to said base member is adjustably connected thereto for angular adjustment about said pivot axis.

6. An apparatus according to claim 5 in which spring means is connected between said rod members at the ends thereof remote from said pivot axis for biasing said rod members toward each other.

7. An apparatus according to claim 6 in which said means for adjusting the block members along the rod members comprise a cable connected to one of said block members and pulley means on opposite ends of said one of said rod members about which said cable is entrained.

8. An apparatus for adjustably controlling the position of a grating of a spectrometer, comprising: a base plate; first and second block elements in superposed relation on said base plate, the uppermost block element supporting the grating of a spectrometer; means extending through said block elements and into said base plate forming a pivot axis normal to the plane of the base plate about which each of said block elements can pivot; first and second rod members fixedly connected to said first and second block elements respectively and extending therefrom; means adjustably connecting one of said rod members to said base plate at its end remote from the block element to which it is connected; a block member slidable on each of said rod members; a bar extending between said block members; means for connecting said bar to each of said block members in a plurality of selectable positions to provide a selectable plurality of predetermined spacings of said block members from each other; and means for selectively fixing the bar member to the block member slidable on said one of said rod members and to the other of said block members at right angles to the rod member on which the selected block slides for spectrometer readout in wave numbers and wavelength respectively; and means for adjusting said block members in unison along said rod members without changing the relationship between said rod members and said block members.

References Cited

UNITED STATES PATENTS

| | | | |
|---|---|---|---|
| 2,951,157 | 8/1960 | Haine et al. | 250—52 |
| 3,020,794 | 2/1962 | Reichel | 88—14 |
| 3,229,563 | 1/1966 | De Mey II | 88—14 |

JEWELL H. PEDERSEN, *Primary Examiner.*

F. L. EVANS, *Assistant Examiner.*